Oct. 11, 1932.   C. S. BRAGG ET AL   1,882,544
BRAKE SYSTEM FOR AUTOMOTIVE VEHICLES
Filed Feb. 24, 1930   7 Sheets-Sheet 1

INVENTORS
BY
ATTORNEY

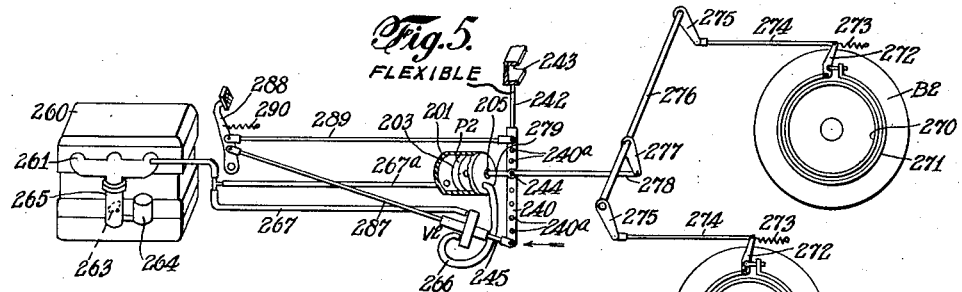
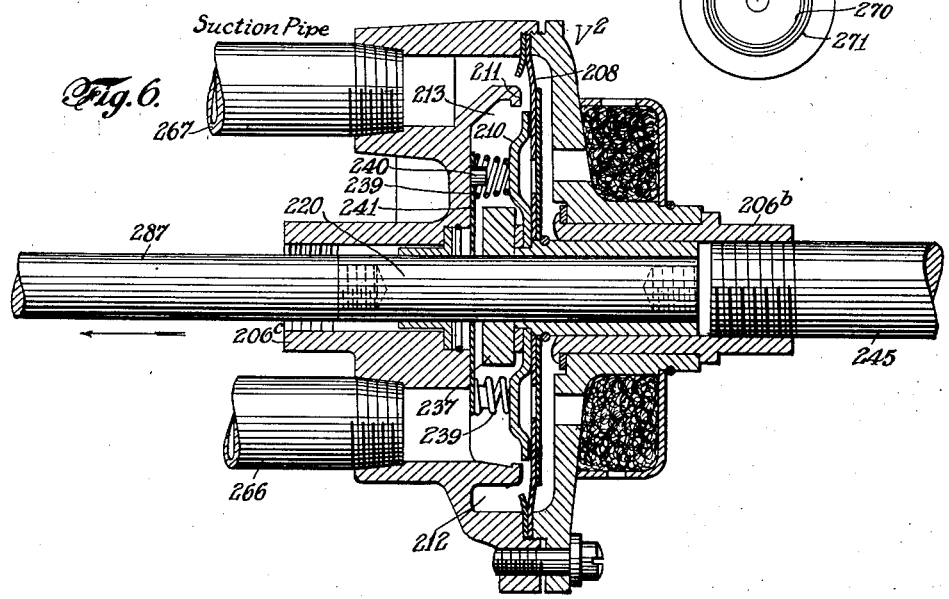
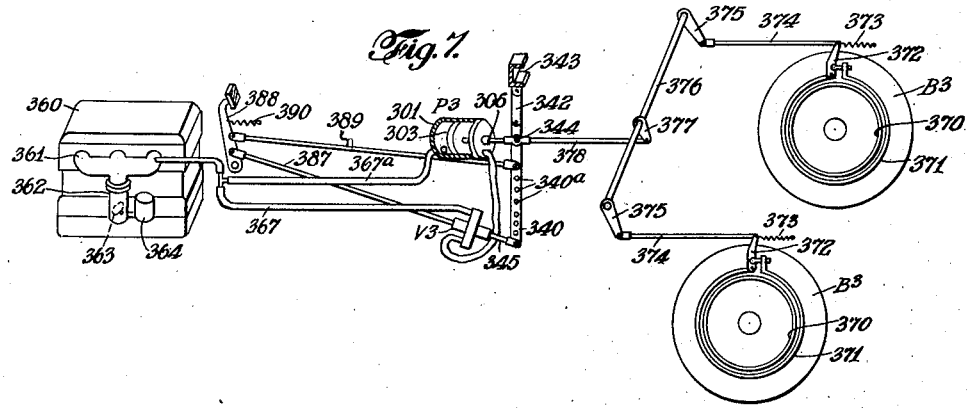

Oct. 11, 1932.  C. S. BRAGG ET AL  1,882,544
BRAKE SYSTEM FOR AUTOMOTIVE VEHICLES
Filed Feb. 24, 1930  7 Sheets-Sheet 4
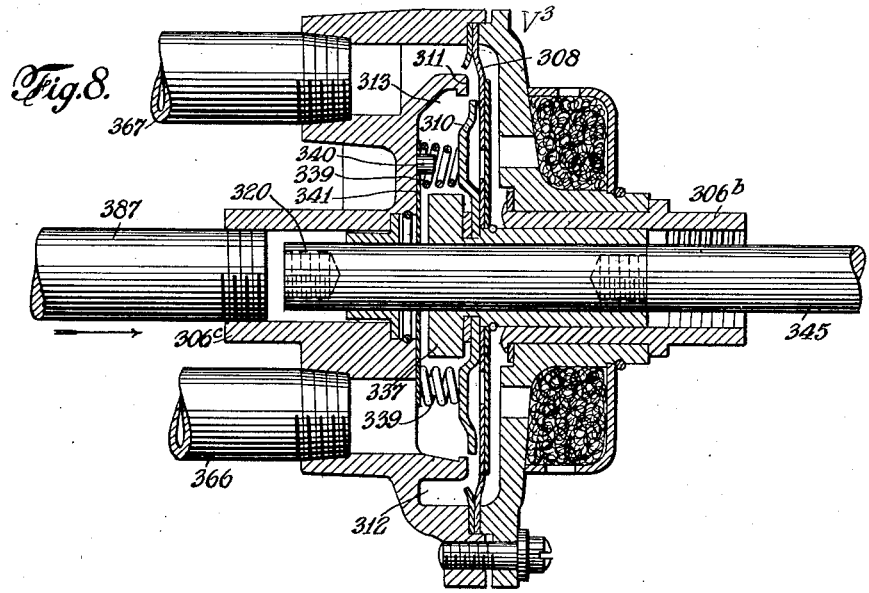
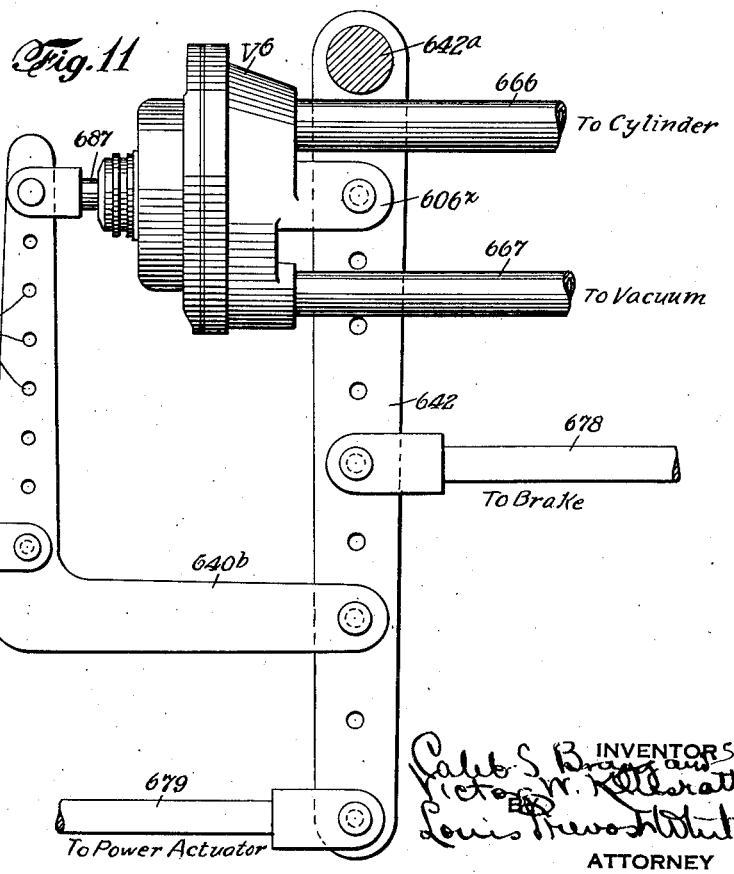

Oct. 11, 1932.   C. S. BRAGG ET AL   1,882,544
BRAKE SYSTEM FOR AUTOMOTIVE VEHICLES
Filed Feb. 24, 1930   7 Sheets-Sheet 5
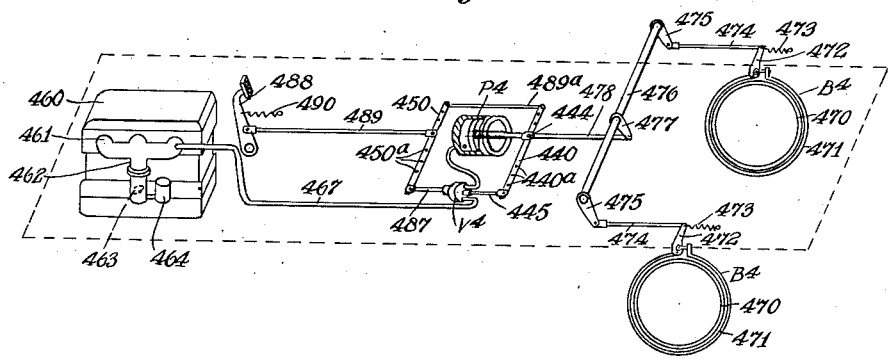
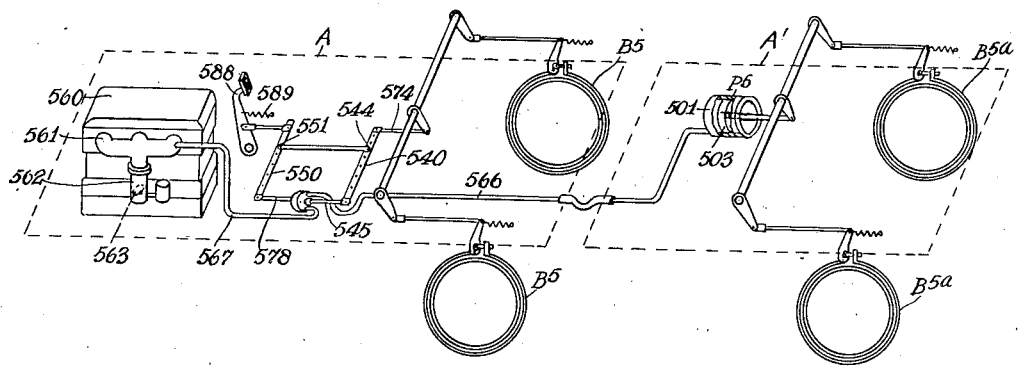
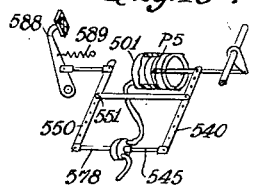

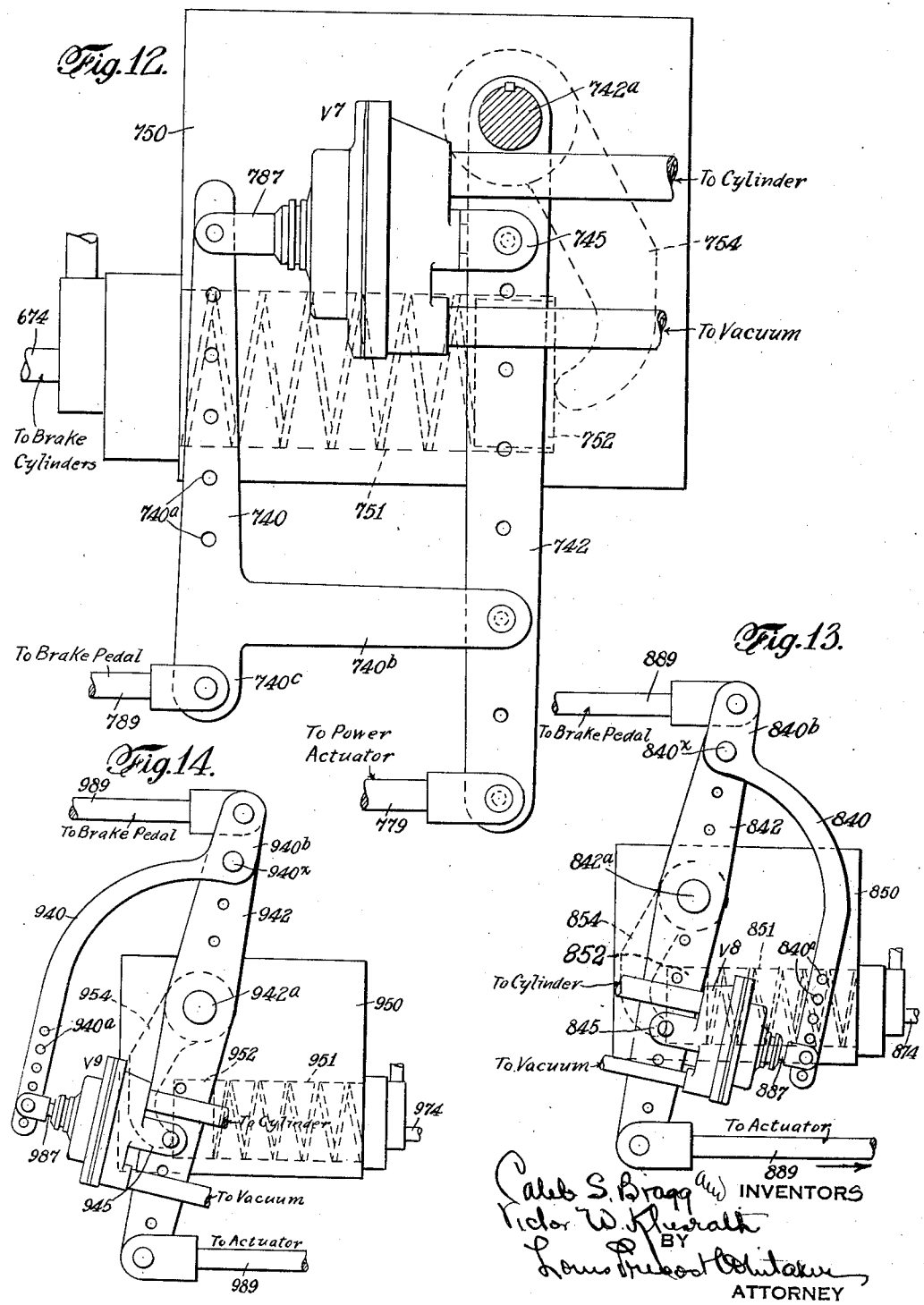

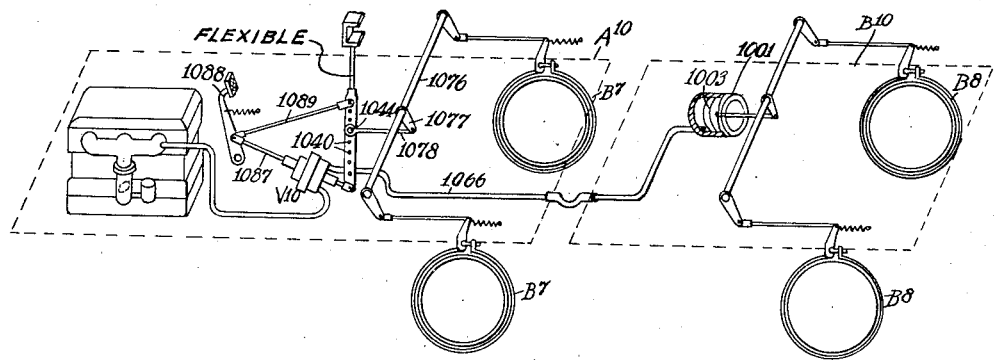
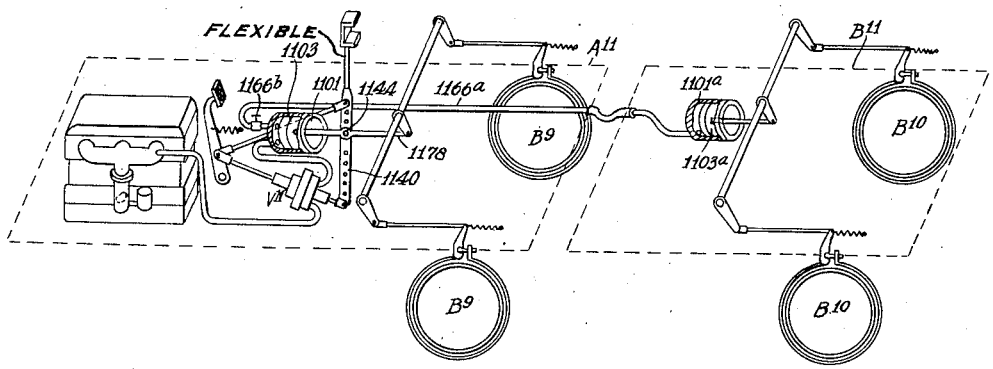

Patented Oct. 11, 1932

1,882,544

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Application filed February 24, 1930. Serial No. 430,850.

Our invention consists in the novel features hereinafter described, reference being had to the accompanying drawings which show several embodiments of the invention selected by us for purposes of illustration, and the said invention is fully disclosed in the following description and claims.

Our present invention is an improvement in vacuum brake system for automotive vehicles, in which the controlling valve means for a power actuator (or actuators) operated by differentials of fluid pressures, comprises parts exposed to the action of the same differentials of fluid pressures, acting in a direction to resist the movement of the physically operated part for operating the valve mechanism, to create a variable reaction or resistance to such movement, whereby the operator is enabled to determine by the extent of such variable reaction, the amount of pressure which the actuator is exerting on the brake mechanism with which it is connected. According to our present invention, we provide means by which said variable reactionary force of any given valve may be transmitted at variable leverages to the physically operated part to increase the amount of reaction, while at the same time the force exerted by the operator in overcoming the said variable reactionary force is not wasted but is transmitted to a brake mechanism of the vehicle through constant brake leverages, which are not changed by said variable leverages for varying said reactionary force. Said brake mechanism may be the same brake mechanism to which the actuator is connected, or different brake mechanism, of the same, or of another vehicle. Our invention also contemplates means whereby after the brakes have been applied with the maximum force which the actuator is capable of exerting plus the physical force necessary to overcome the variable reactionary force of the valve mechanism, the operator is enabled to apply further physical force to the brake mechanism connected with the physically operable part, and to operate said brake mechanism by physical force alone in case of failure of power.

In carrying our invention into effect we preferably employ a floating lever connected with the physically operable part, with the controlling valve mechanism, with a brake mechanism, and with a power actuator if one is used to operate said brake mechanism, said lever being so constructed that the leverage between the valve mechanism and the physically operated part may be varied, without varying the leverage between the physically operated part of the brakes, to vary the amount of force the operator must exert on the brakes in operating the valve mechanism to apply the brakes by power, so that the valve mechanism may be manufactured in a single standard size or a few standard sizes, and by use of said leverage may apply to the brakes of the vehicle or vehicles the physical force of the operator and the power of the actuator in any desired proportions. The floating lever may be supported by any means which permits proper movement of the parts or may be supported entirely by the linkages or rodding to which it is connected, and may be used alone or in connection with a second floating lever forming part of said connections if desired.

We wish it to be understood that the present invention is applicable to vacuum brake systems in which the power actuator (or actuators) is (or are) pressure-balanced or vacuum-balanced when in released position, and in which the valve mechanism is operated by tension, or compression, with equally good results.

In the accompanying drawings which show several embodiments of our invention selected by us for the purpose of illustration, Fig. 1 is a diagrammatic perspective view of an automotive vehicle provided with a vacuum brake system embodying our invention, and showing an actuator of the pressure-balanced type, and the controlling valve mechanism operated by tension.

Fig. 5 is a view similar to Fig. 1, showing an actuator of the vacuum-balanced type, and the controlling valve mechanism therefor operated by tension.

Fig. 6 is an enlarged view of the controlling valve mechanism shown in Fig. 5.

Fig. 7 is a view similar to Fig. 3, showing the controlling valve mechanism operated by compression, and controlling an actuator of the vacuum-balanced type.

Fig. 8 is an enlarged view of the controlling valve mechainsm shown in Fig. 7.

Fig. 9 is a view similar to Fig. 1, showing a modification of our invention in which two floating levers are employed, the actuator shown being of the pressure-balanced type, and the controlling valve mechanism operated by tension.

Fig. 10 is a similar view showing a further modification in which a controlling valve mechanism is operated by compression in one brake mechanism and in which the actuator controlled by said valve mechanism operates another brake mechanism.

Fig. 10a represents a slight modification of Fig. 10.

Fig. 11 is an enlarged detail view illustrating a modified embodiment of our invention, in which the valve mechanism and floating lever are operatively connected with and supported by a power applying lever for the brake mechanism to which a power actuator is connected, and in which the valve mechanism is adapted to be operated by tension.

Fig. 12 represents a similar view of a further modification of our invention in which the valve mechanism is operated by compression, and in which the power applying lever is operatively connected with the pressure piston of a hydraulic brake mechanism.

Fig. 13 is a detail view of another modified arrangement embodying our invention.

Fig. 14 is a similar view showing a slightly modified arrangement of the parts illustrated in Fig. 13.

Fig. 15 is a view similar to Fig. 1, in which a controlling valve mechanism operated by a pulling action is located in the connections between the pedal lever and one set of brake mechanisms, and in which the actuator controlled by said valve mechanism operates other brake mechanisms.

Fig. 16 is a similar view showing a further modification.

Figure 1:
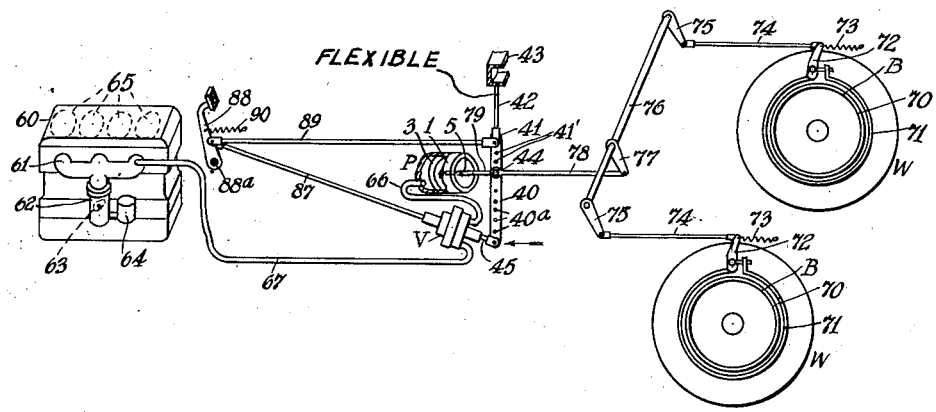
Figure 2:
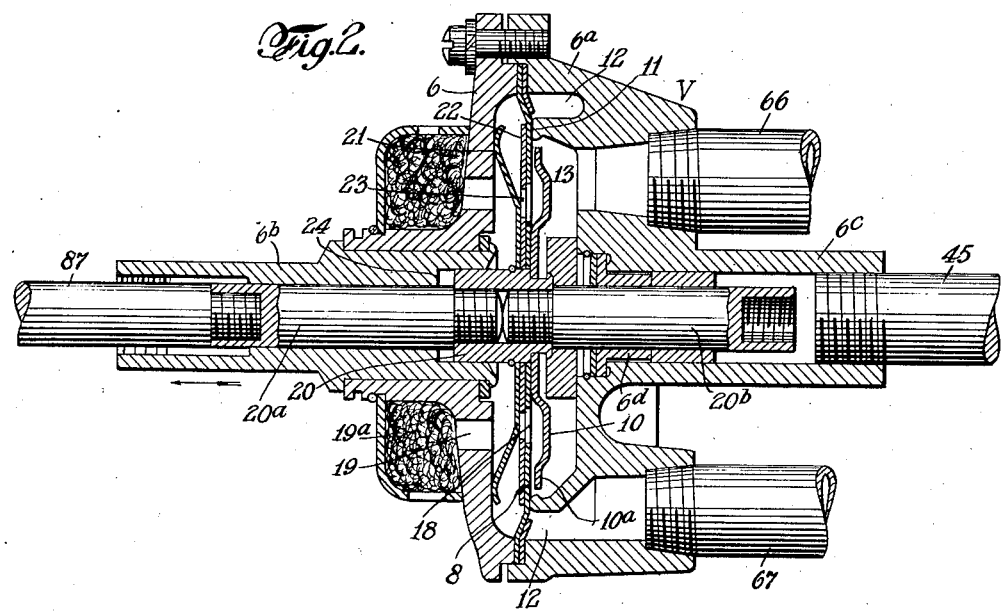
Fig. 2 is an enlarged view of the controlling valve mechanism shown in Fig. 1.

Referring to the embodiment of our invention shown in Figs. 1 and 2, Fig. 1 represents diagrammatically a brake system applied to an automotive vehicle driven by an internal combustion engine, indicated at 60, which is provided with a suction passage comprising the intake manifold, 61, and the vertical passage, 62, provided with the usual throttle valve, 63, located between the carburetor, 64, and the engine cylinders, the latter of which are indicated by dotted lines at 65. In such an engine a partial vacuum of approximately twenty inches of mercury on the vacuum gauge is produced in the suction passage whenever the throttle valve is closed or partly closed, which vacuum is available for the operation of brake mechanism without detracting from the power of the engine for propulsion purposes, which is not needed for that purpose at the times when the brakes are to be applied. W, W, represent a pair of wheels of the vehicle provided with brake mechanisms, indicated as a whole at B, B. It is to be understood that the brake mechanism may be applied to as many wheels of the vehicle as desired, and that the brake mechanism may be of any usual or preferred type. The type here shown for purposes of illustration comprises a brake drum, 70, secured to the wheel, brake band, 71, brake applying lever, 72, and the usual retracting spring or springs, indicated at 73. In this instance the brake levers, 72, are shown connected by a link, 74, an arm, 75, with a cross-shaft, 76, having an arm, 77, to which the power for applying the brakes is applied. P represents the power actuator, comprising in this instance a cylinder, 1, closed at one end and open at the other, and a piston, 3, having a piston rod 5 operatively connected, by rods 78 and 79, with the arm, 77. The portion of the actuator cylinder, 1 between the piston and the closed end of the cylinder is operatively connected by the controlling valve mechanism, indicated as a whole at V, alternately with the atmosphere (or other higher fluid pressure source), and with suction, i. e., the suction passage of the engine between the throttle valve and engine cylinders. We prefer to employ a valve mechanism in which there are parts connected with the physically operable part, as a brake pedal, 88, provided with the usual retracting spring, 90, which valve parts are exposed to a differential of fluid pressures corresponding with that in the actuator when it is operated, and tending to resist the movement of the physically operable part, so as to produce a reaction which will be felt by the operator and must be overcome by him. This reactionary force exerted by parts of the valve mechanism is very desirable, as it apprises the operator as to the amount of power which the power actuator is exerting on the brakes.

While we do not limit ourselves to the specific form of valve mechanism shown herein, we have illustrated in Fig. 2 one form of valve mechanism suitable for this purpose, the specific construction of which is covered by our previous applications for Letters Patent of the United States, Serial No. 231,724 filed November 7, 1927, and Serial No. 383,221 filed August 3, 1929, and which forms no part of our present invention. This valve mechanism will be briefly described in order that its operation may be clearly understood. The casing of the valve mechanism is conveniently formed in two parts, 6 and 6ª, connected in any suitable way, as by screws. Between the casing parts are clamped the marginal portions of a flexible diaphragm, 8, provided with inlet aperture, 18, at all times in communication with the atmosphere through apertures, 19, in the casing member, 6, which may be provided with an air strainer, indicated at 19ª. The casing member, 6ª, is provided with an annular seat, 11, dividing the interior into a central chamber, 13, and an annular suction chamber, 12, surrounding the same, which chambers are disconnected when the diaphragm is seated. The chamber, 13, is provided with a disc valve, 10, having an annular seat, 10ª, for engaging the diaphragm and closing communication between the air inlet apertures, 18, and the chamber, 13. The disc valve and diaphragm are connected centrally with a valve actuating part, 20, which has extensions, 20ª and 20ᵇ, provided with threaded sockets or other connecting means for attaching an operating rod. The casing member, 6, is provided with a sleeve member, indicated at 6ᵇ, surrounding the extension, 20ª, and provided at its outer end with an internally threaded portion or other means for attaching an operating rod. The casing member, 6ª, is provided with a similar sleeve, indicated at 6ᶜ, and as the chamber, 13, is at all times connected with the source of vacuum, we prefer to provide a sealing member, indicated at 6ᵈ, between the sleeve, 6ᶜ, and the extension, 20ᵇ. The valve actuating part, 20, may be provided, as shown, with a spring spider, indicated at 21, for normally holding the diaphragm, 8, seated, and the disc valve, 10, unseated, in the released position of the parts, and a reinforcing plate, 22, may also be employed between the spring, 21, and the central portion of the diaphragm, to assist in holding the diaphragm seated in the released position, in which case the plate, 22, will be provided with apertures, 23, registering with the apertures, 18, in the diaphragm itself. The chamber, 13, of the valve casing is connected by a flexible pipe, 66, with the closed end of the cylinder, 1, of the actuator, and the annular suction chamber, 12, is connected by a flexible suction pipe, 67, preferably with the intake manifold, or other portion of the suction passage between the throttle valve and the engine cylinders. In all the embodiment of our invention herein described, it will be understood that the pipe connections to the valve mechanism will be flexible to permit the necessary bodily movements of the valve mechanism.

It will be seen that when the parts of the valve mechanism are in the released position, the actuator cylinder forward of the piston will be connected by the flexible pipe, 66, and chamber, 13, with the atmosphere, and as the outer face of the piston is at all times exposed to atmosphere, the piston is balanced by the atmosphere or higher pressure fluid. This type of actuator we call for convenience the pressure-balanced type, to distinguish it from the vacuum-balanced type hereinafter described. It will also be seen that by moving the valve actuating part, 20, in the direction of the arrow, Fig. 2, so as to first seat the disc valve on the diaphragm and thereafter unseat the diaphragm from the seat, 11, the actuator cylinder forward of the piston will be connected with the vacuum pipe, 67, so as to withdraw air from the actuator forward of the piston and permit the pressure of the air on its outer face to move the piston inwardly to apply the brakes. Chamber, 13, is also connected with the source of suction, and atmospheric pressure tends to force the atmospheric valve means to the right, (Fig. 2), and also tends to force the valve casing to the left, which assists the piston of the actuator in applying the brakes, and also tends to seat the diaphragm, 8, and shut off the source of suction when the operator stops the movement of his foot. It will also be seen that when the operator stops the movement of his foot, the continued movement of the valve casing by the power actuator will cause the diaphragm, 8, to seat on the seat, 11, without unseating the disc valve, and the actuator will be disconnected from suction without reconnecting it with the atmosphere, thus locking the vacuum, which may have been obtained, and holding the brakes as applied. The operator must exert a constant amount of force equal to the reaction which exists in the valve mechanism, to thus hold the brakes applied. To release the brakes, the operator will slightly release the pressure of his foot on the pedal, when the reactionary force of the valve mechanism, exerted on the disc valve and valve casing, will be released, unseat the disc valve, and admit air to the actuator cylinder, equalizing pressures on the actuator piston and in the valve mechanism, and permitting the brake mechanism and the actuator piston to be returned to released position. The pedal also returns to released position, and if the operator keeps his foot on the pedal he can arrest the return movement of the piston at any point by increasing his pressure on the pedal above the reactionary force of the valve, at any point in the stroke of the pedal below that for the maximum power of the actuator. Obviously, as the brakes are released and pressures approach equalization in the actuator and in chamber, 13, of the valve mechanism, the reactionary force of the valve mechanism will gradually decrease as the parts approach the released position. The longitudinal movement of the valve actuating part, 20, is limited in this instance by a shoulder, 24, on the sleeve, $6^b$, so that after the valve has been operated to apply the brakes with the maximum force of the actuator, any further physical force applied to the valve is transmitted through the valve casing to the brakes, as the valve mechanism is inserted in the linkage between the operator operated part of the brake mechanism, as hereinafter described. The brakes may be applied by the physical force of the operator alone in case of failure of power. It will be understood that the relative movement between the valve casing and valves can be effected either by moving the valves forward (to the left, Fig. 2), with respect to the casing, in which case we term the valve mechanism as operating under tension, or the valve mechanism may be operated by moving the valve casing rearwardly (to the right, Fig. 2) with respect to the valves, in which case the valve mechanism operates by pressure. The form of valve mechanism which we have described and which is illustrated in Fig. 2 can be operated in either of these ways, by making the proper connections with the extension of the valve actuating part, 20, at one end, and the sleeve connected with the valve casing at the other end, as hereinafter described.

It has been proposed to insert a reactionary valve in the rod connecting the operator operated part with the brakes, but as the pedal ratio changes from three to one on light cars to twelve to one on heavy busses and trucks, and as it is desirable to be able to stop or at least control the vehicle by the physical force of the operator should power fail, it is obvious that a valve giving the desired amount of reaction for a three to one pedal leverage would be too light to be efficient at a twelve to one pedal leverage. Therefore, it would be necessary to manufacture many sizes of valves with the following objections. In the first place, it would necessitate the manufacture and the carrying of valves in stock in a large number of sizes to meet the requirements of different installations, which would add to the expense of production, and stock. In the second place, such an increase in the size of the valve mechanism as might be desirable to give a required reactionary effect, might unduly increase the weight of the valve mechanism and also increase its size so as to interfere with its installation in the limited space under the car which it can be permitted to occupy. The object of our present invention, therefore, is to provide means for variably increasing this reactionary effect of the valve mechanism by suitable leverage between the valve mechanism and the physically operable part, without changing the leverage ratio between the physically operable part and the brakes, so that with a single size of valve or with a very small number of standard sizes, any degree of reactionary effect on the pedal can be produced according to the installation in which the valve mechanism is used. A further object of our invention, as before stated, is to so arrange the valve mechanism that all the physical force of the operator which must be exerted in overcoming this reactionary effect shall be made to do useful work, by transmitting it directly to a brake mechanism. In Fig. 1 we have shown a simple installation whereby these two novel and useful effects are obtained. In this figure 40 represents what we term a floating lever, by which we mean a lever which is not only capable of movement about a fulcrum, but is also capable of bodily movement as a whole. This lever may be supported in any desired way. For example, it may be entirely supported by the linkages or rodding connected to it, or it may be supported from a part of the chassis by means of a bracket or of a flexible or otherwise movable link which will accommodate the bodily movement and other movements of the lever. In this instance the lever, 40, is shown as pivoted at its upper end at 41, to a link, 42, in this instance a flexible link, the upper end of which is secured to a part, 43, of the chassis. The upper end of the floating lever 40, is in this instance connected by a link, 89, with the pedal lever, 88, above the point of pivoting, $88^a$, thereof. At a point between its ends indicated at 44, the floating lever, 40, is connected by a link, 78 with the arm 77, for operating the brake mechanism, and preferably at or near the same point the lever, 40, is connected by a link 79, with the piston rod, 5, of the power actuator. The lower end of the floating lever, 40, is connected by a short link rod 45, with the sleeve, $6^c$, of the valve casing, as indicated in Fig. 2, and the valve actuating part, 20, of the valve mechanism, V, is connected by a link rod, 87, with the pedal lever above the point of pivoting thereof.

It will thus be seen that the floating lever may move bodily and also may change its position angularly with respect to the chassis. The floating lever, 40, is shown provided with a plurality of apertures, $40^a$, $41^1$, but other equivalent means may be employed by which the relative positions at which the link rod, 89, and the link rod, 45, is connected, may be varied with respect to the connections between the floating lever and the brake mechanism, so that the reaction of the valve casing, which in this instance will be exerted on the lower end of the floating lever in the direction of the arrow Fig. 1, will be transmitted to the pedal through the link rod, 89, and multiplied in accordance with the difference in the effective lengths of the two arms or portions of the floating lever respectively, above and below the point of pivoting, 44. This point, 44, may be termed the fulcrum of the lever, and by varying the effective lengths of the said arms or portions of the floating lever, as by connecting the link rods, 89 and 45, at different apertures, 40$^a$ and 40$^1$, the amplification of the reactionary force of the valve casing as applied to the pedal may be increased or decreased to produce the desired amount of reaction in a particular installation. Both the valve means and the valve casing have approximately the same area subjected to the variable differentials of pressure, which in the case of the valve means is directly transmitted to the pedal through the rod, 87, whereas the differential of pressures on the valve casing is transmitted to the pedal through the lever, 40, and the amount of reaction of the latter may be increased or decreased by varying the fulcrum point, 44, of the lever, 40, or otherwise changing the effective lengths of the arms of said lever.

The operation of the device in applying and releasing the brakes will be as follows: Assuming that the parts are in released position as in Fig. 1, if the operator desires to apply the brakes, he will place his foot upon the pedal, 88, and depress it slightly, thereby pulling through rod, 89, on the upper end of the floating lever, 40, and through rod, 87, upon the valve actuating part, 20, which is capable of limited movement with respect to the valve casing. The pull on the upper end of the floating lever will tend to rock the upper end forwardly to a slight extent on the fulcrum, 44, as the resistance of the brakes must at some time be greater than the resistance of the valve mechanism, and to cause the lower end of the lever to move backward in a direction opposite to that indicated by the arrow in Fig. 1, and move the valve casing backward in a direction opposite to the arrow in Fig. 1 with respect to the valve actuating part, 20 (see Fig. 2), which moves with the pedal through the connecting link, 87. This will seat the disc valve, 10, on the diaphragm, 8, and unseat the diaphragm, connecting the actuator forward of the cylinder with suction, and causing the piston, 3, to move forward in a direction to apply the brake mechanism. The piston will then carry the floating lever bodily forward as long as the pedal continues to move forward, holding the diaphragm unseated. As the differential of fluid pressures on the actuator piston increases, a corresponding differential of fluid pressures will be exerted on the disc valve, 10, and the diaphragm, 8, in a direction opposite to the arrow, and on the valve casing in the direction of the arrow, Fig. 1. The reaction on the disc valve, 10, and diaphragm, 8, will be directly applied to the pedal through the rod, 87, and the reaction on the valve casing will be applied to the lower end of the floating lever, 40, and transmitted through the fulcrum, 44, to the upper end of the lever, and through rod, 89, to the foot pedal, and may be increased or decreased in the manner previously described. The operator must overcome the gradually increasing differential of fluid pressures on the diaphragm and on the valve casing, which latter may be multiplied by the leverage of the floating lever, say two times or three times as the case may be, in order to keep the diaphragm valve open and continue the evacuation of the actuator cylinder and the forward stroke of the piston, and all physical power so exerted by the operator will be applied to the brakes in addition to the power of the power actuator. If the operator stops the forward movement of his foot on the pedal, this will instantly arrest both the valve operating part, 20, and the upper end of the floating lever, 40, and the slightest continued movement of the piston will move the lower end of the floating lever forward, effecting relative movement of the valve casing with respect to the diaphragm, so as to seat the diaphragm without unseating the disc valve, 10, thus disconnecting the actuator cylinder from suction and holding the brakes as applied. A further forward movement of the pedal will operate in the same manner to apply the brakes with greater force, and the brakes may thus be applied gradually, a little at a time, or applied to any desired degree, and the amount of force which the actuator piston is exerting on the brakes will be communicated to the operator by the amount of force which he must exert to overcome the reaction of the valve mechanism multiplied by the floating lever. As the floating lever is connected with the brakes and moves bodily with the pedal and with the piston of the actuator, the amount of physical force which the operator has to exert on the floating lever in order to keep the diaphragm valve open or to prevent the disc valve from opening, will be transmitted directly to the brake mechanism in a direction to assist the piston of the actuator, and none of this physical force is lost or exerted at any time in opposition to the movement of the actuator piston, nor is the leverage between the foot pedal, 88, and the brakes changed regardless of the point of the connection of the links, 45, 78 and 89, with the floating lever, 40.

When the brakes have been applied with the full power of the actuator, the operator, by exerting additional pressure on the pedal beyond that required to keep the diaphragm valve unseated, may apply his physical force to both ends of the floating lever in a direction to move it bodily and apply such additional force also to the brake mechanism directly in addition to that exerted by the power actuator. In like manner, if the power should fail for any reason, or if the engine is not running and no vacuum exists in the suction passage, the operator can apply the brakes directly by physical force alone. In such case when the pedal is moved forward, the valve casing and valves will be moved relatively to take up the lost motion between the valve actuating part and the valve casing, after which the floating lever will move forward bodily together with the actuator piston to apply the brakes by physical force. The actuator piston will have no retarding effect beyond its friction with the cylinder walls, as the first movement of the foot pedal will shift the valve into position to vent the actuator cylinder through the suction pipe, 67, to the suction passage of the engine.

Figure 3:
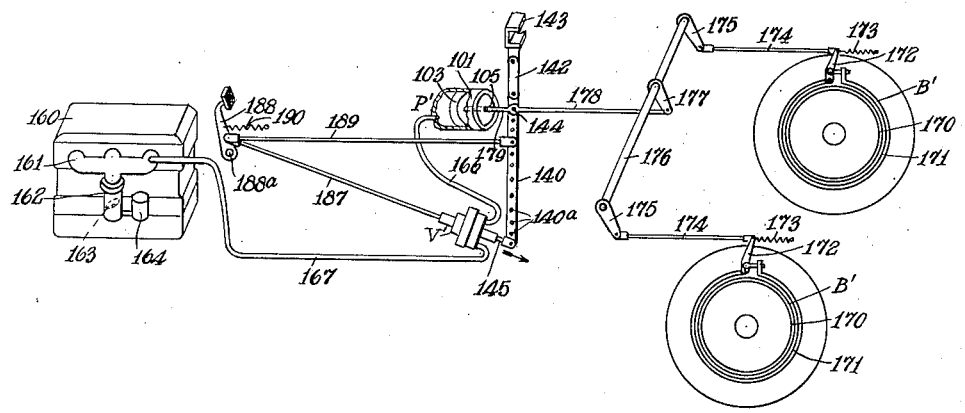
Fig. 3 is a diagrammatic view of a brake system similar to that illustrated in Fig. 1, but showing the controlling valve mechanism operated by compression, as distinguished from the tension operated valve of Figure 2.
Figure 4:
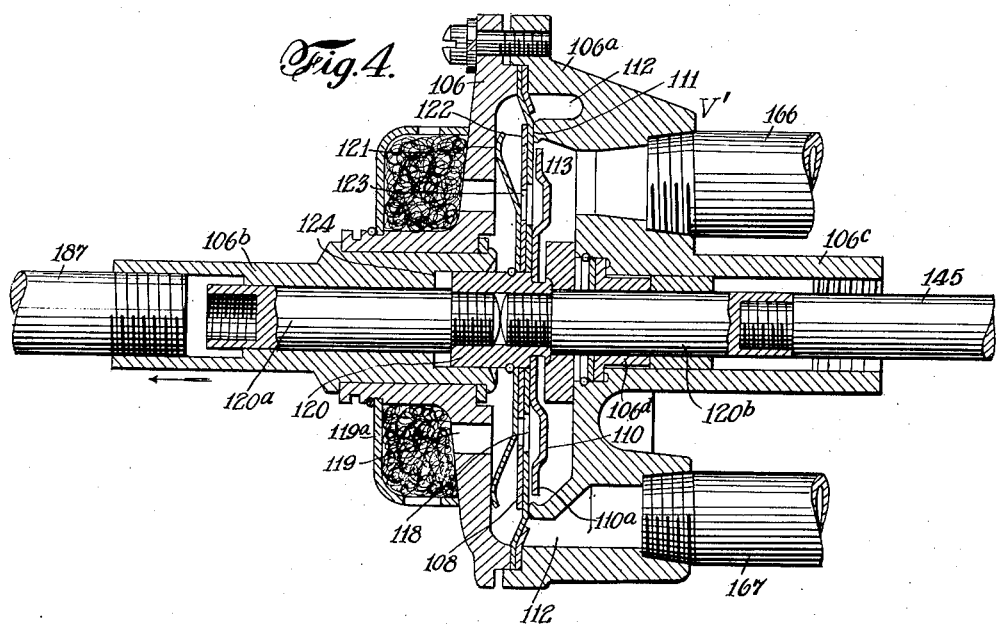
Fig. 4 is an enlarged view of the controlling valve mechanism shown in Fig. 3.

In Figs. 3 and 4 we have illustrated another embodiment of our invention in which the valve mechanism is operated by pressure, i. e., a pushing action instead of tension, i. e., a pulling action. In these figures, the parts corresponding with those in Figs. 1 and 2 are given the same reference numerals with the addition of 100. In this instance the floating lever, indicated at 140, is shown supported at its upper end by a pivoted link, 142, from a stationary part, 143, of the chassis. The link rod, 178, from the brake mechanism is connected to the floating lever at a point, 144, adjacent to its upper end, and the piston rod, 105, of the actuator, P¹, is connected at substantially the same point with the floating lever, by the link, 179. The pedal lever, 188, is connected above its point of pivoting, 188ª, by the link, 189, with the floating lever at a point below the connection, 144, with the brake mechanism and piston. In this instance the extension, 120ᵇ, of the valve actuating part, 120, is connected by the link rod, 145, with the floating lever at a point below the point of connection with the brakes, 144, and with the rod, 189, and the sleeve, 106ᵇ, of the valve casing is connected by the link rod, 187, with the pedal above the point of pivoting thereof. The valve mechanism shown in detail in Fig. 4 is exactly the same in construction as that shown in Fig. 2 and previously described, the only difference being the manner in which it is connected between the lower end of the floating lever and the pedal. The other parts are constructed as previously described and the operation is the same, except that when the pedal is depressed to effect an application of the brakes, the valve will be operated by a pushing action instead of a pulling action. In other words, the first movement of the pedal will be transmitted through the link rod, 189, to the floating lever at a point below the connection, 144, with the brakes, whose resistance will tend to make the lower end of the lever move forwardly in a direction opposite that of the arrow in Fig. 3 more rapidly than the rod, 187. This will cause the rod, 145, to push the valve actuating part, 120, in the direction of the arrow in Fig. 4, and operate the valve mechanism in the same manner as previously described. The reactionary effect on the valve, 110, and the diaphragm, 108, will in this case be exerted in the direction of the arrow in Fig. 3, and will be amplified through said lever and the rod, 189, to the pedal in proportion to the difference in distance of the connection of the rod, 189, and rod, 145, respectively, from the pivotal point, 144. The reactionary effect on the valve casing in the direction of the arrow, Fig. 3, will be directly applied to the pedal through the rod, 187. The floating lever, 140, will likewise move forward bodily with the pedal and with the piston of the actuator, so that the pressure which the operator exerts on the pedal to keep the valve open will be transmitted to the brake mechanism, and if the operator stops the movement of his foot and the pedal before the brakes are applied by the full power of the actuator, the continued forward movement of the piston will move the upper end of the floating lever forwardly, and the lower end rearwardly on the connection, with rod, 189, as a center, thus reseating the diaphragm valve.

It will also be seen that in case of failure of power, the operator can apply his physical force to move the floating lever bodily forward and apply the brakes in the manner previously described with reference to Fig. 1, the first movement of the pedal shifting the valve into position to vent the cylinder. The floating lever, 140, is likewise shown provided with a plurality of apertures, 140ª, to permit of varying the leverage, and consequently the amount of amplification of the reactionary force as it is transmitted to the pedal.

In Figs. 5 and 6 we have shown diagrammatically an embodiment of our invention similar to that illustrated in Figs. 1 and 2, except that in this case the piston of the actuator instead of being submerged in the higher fluid pressure, i. e., atmosphere, when the parts are in the released position, is normally maintained submerged in vacuum in the released position, and the valve mechanism which operates by tension or pull is slightly modified to meet the requirements of this type of actuator. The parts shown in Figs. 5 and 6 which correspond with those in Figs. 1 and 2 are given the same reference numerals with the addition of 200. As indicated in Fig. 5, the power actuator, P², comprises a cylinder, 201, which is closed at both ends and is provided with the piston, 203, a piston rod, 205, connected to the floating lever, 240, by link, 279, at the point, 244, as in Fig. 1. In this instance the portion of the actuator cylinder forward of the piston is connected at all times by means of a suction pipe, 267ª, with the suction passage of the engine. This suction pipe may be connected, as shown, to the main suction pipe, 267, leading from the manifold of the engine to the valve mechanism. The rods, 287 and 289 in Fig. 5, and 387 and 389 in Fig. 7, are also connected to the pedal lever at different points instead of being connected thereto at the same point.

In this type of actuator, the valve mechanism is constructed so that it normally connects the actuator cylinder in rear of the piston with suction, and a power stroke is effected by admitting the higher fluid pressure, i. e., atmosphere, to that portion of the cylinder, and the brakes are released by again connecting this portion of the cylinder with the suction.

In Fig. 6 we have shown a modified form of valve mechanism suitable for this purpose, the specific construction of which forms no part of our present invention, as it is covered by our former application for Letters Patent of the United States, Serial No. 392,004, filed September 12, 1929. This valve mechanism, indicated as a whole at $V^2$ in Figs. 5 and 6, will be described only so far as is necessary for a complete understanding of our present invention. In this construction the valve casing is formed similarly to that previously described, but the disc valve, 210, is held seated on the diaphragm, 208, and the diaphragm is held unseated with respect to the seat, 211, by means of a circular series of coiled resistance springs, 239, when in the released position, as shown in Fig. 2. These springs, 239, are held in proper position in any suitable manner, as by studs, 240, on a plate, 241, engaging the back wall of chamber, 213. In this position of the valve mechanism the suction chamber, 212, is connected with the pipe, 266, leading to the actuator cylinder in rear of its piston, and the maximum differential of fluid pressures is exerted on the valve means in the direction of the arrow in Fig. 6. The springs, 239, act in a contrary direction against the disc valve and diaphragm, and are so calibrated that their combined resistance is nearly counterbalanced by the maximum differential of fluid pressures to which the diaphragm and disc valve is subjected. These springs, 239, being interposed between the valve means and the valve casing and being substantially neutralized by the maximum differential of fluid pressures on the valve means, when in the released position, become effective in proportion as the pressures on opposite sides of the valve means approach equalization reacting in one direction on the valve means and in the opposite direction upon the valve casing. This valve mechanism is also shown herein as being operable either by a pushing movement or a pulling movement, and in this instance the valve actuating part, 220, is provided with a threaded recess at each end, and the outer ends of the valve casing sleeves, 206ᵇ and 206ᶜ, are provided with interiorly threaded portions.

As illustrated in Fig. 5, in which the valve operates by tension or pulling action, the link rod, 287, is connected with the valve actuating part, 220, and the link rod, 245, connects the sleeve, 206ᵇ, with the lower end of the floating lever, 240. The link rod, 289, connects the upper end of the floating lever, above the point, 244, with the pedal lever, in this instance at a different point from that at which the link rod, 287, is connected.

When the operator depresses the pedal lever to effect a power stroke of the piston, which is vacuum-balanced in the released position, the movement of the valve actuating part, 220, in the direction of the arrow, by a rod, 287, will first effect the seating of the diaphragm, 208, on the annular seat, 211, to disconnect the portion of the actuator cylinder in rear of the piston from the suction pipe, and a further movement of the pedal will move the disc valve away from the diaphragm and connect said portion of the actuator cylinder with the atmosphere.

As the pressure builds up in the cylinder in rear of the piston and in chamber, 213, the differential of fluid pressures on opposite faces of the disc valve will decrease, gradually reducing the counterbalancing or neutralizing action of said differential on the springs, 239, which will therefore exert gradually increasing reactionary pressure in both directions. The reactionary pressure on the disc valve will be transmitted directly to the pedal through the rod, 287, in a direction opposite that of the arrow in Fig. 6, while the reactionary effect of said springs on the valve casing will be transmitted to the lower end of the lever, 240, in the direction of the arrow in Fig. 6, and will be transmitted by the upper end of said lever and rod, 289, to the pedal, as amplified by said lever. The physical force exerted by the operator to overcome these reactions will be transmitted to the brake mechanism, as previously described. The brakes may be applied gradually and held at any desired pressure and released, and the operator can apply his physical force to the brake mechanisms and operate them by physical force alone, as previously described with reference to Fig. 1. The valve actuating part, 220, is provided with a stop collar, 237, to engage the casing when the operator adds his physical force to that of the actuator or applies the brakes by physical force alone.

In Figs. 7 and 8 we have illustrated an embodiment of our invention similar to that shown in Figs. 3 and 4, except that the power actuator, indicated at $P^3$, is of the vacuum-balanced type, and the valve mechanism, indicated at $V^3$, which is constructed exactly as shown in Fig. 6, is connected in the manner indicated in Fig. 8, so as to be operated by a pushing action instead of a pulling action. In these figures the parts corresponding with those shown in Figs. 1 and 2 are given the same reference numerals with the addition of 300. The link rod, 387, is connected with the casing sleeve, 306°, at one end, and at the other end to the brake pedal, 388. The link rod, 345, is connected with the valve actuating part, 320, at one end and at the other end of the lever, 340, and the link rod, 389, is connected to the lever, 340, at a point below the connection, 344, but nearer thereto than the connection between the rod, 345, and said lever, the forward end of rod, 389, being connected to the pedal lever at a different point from the connection therewith of the rod, 387. In this construction the first movement of the pedal will be transmitted through the link rod, 389, to the floating lever, 340, below its connection with the brakes, the resistance of which will tend to make the lower end of the lever move forwardly, or in a direction toward the pedal lever. This will exert a pushing action on the rod, 345, which will operate the valve actuating part, 320, to close the communication between the rear end of the cylinder and suction, and open communication from said portion of the cylinder to atmosphere. The resistance springs, indicated at 339 in Fig. 8, as they gradually become effective by the breaking down of the differential of fluid pressures on the valve means, will be exerted in this instance on the valve casing and through rod, 387, directly to the pedal in one direction, and upon the disc valve and through the rod, 345, in the opposite direction, and transmitted through rod, 389, to the pedal, as amplified by the lever, 340. After the full power of the actuator has been exerted, the operator may apply further physical force to the pedal, so as to bring the stop collar, 337, into engagement with the valve casing, after which he can add his physical force to the brakes in addition to that of the actuator, but in like manner he can apply the brakes by physical force alone in case of failure of power. The lever, 340, is shown provided with a series of apertures, 340ª, for varying the amplification of the reactionary force transmitted through said lever.

In Fig. 9 we have illustrated another embodiment of our invention corresponding substantially with that shown in Fig. 1, except that a second floating lever is interposed in the connections between the pedal lever and the main floating lever. In this figure, the parts corresponding with those shown in Fig. 1 are given the same reference numerals with the addition of 400. In this instance the short arm of the floating lever, 440, is connected by a link, 489ª, with the corresponding portion of a second floating lever, 450, which is connected between its ends by the link, 489, with the pedal lever, 488. Between the long arms of the floating levers, 440 and 450, the valve, V⁴, is inserted. This valve is of the type shown in Fig. 2 and is adapted to be operated by tension or pulling, the valve casing being connected by link, 445, with the long arm of lever, 440, and the valve actuating part being connected by link, 487, with the long arm of lever, 450. Both of the floating levers are provided with adjusting apertures, indicated at 440ª and 450ª, so that the amount of amplification of the reactionary forces of the valve mechanism may be adjusted.

It will be seen that when the pedal is depressed force will be applied to both floating levers, and as the link rod, 489ª, is a positive connection, the levers, 450 and 440, will tend to separate at their outer ends and thereby operate the valve mechanism to apply the brakes by means of the power actuator. In this instance the reactionary forces of the diaphragm and disc valve (see Fig. 2) will be transmitted through the amplifying lever, 450, and rod, 489, to the pedal, while the reactionary force of the valve casing will be transmitted through the power amplifying lever, 440, through link, 478, to the arm, 477, and therethrough to the brakes. The force exerted by the operator on the pedal to overcome the reactionary force of the valve mechanism will be transmitted through to the brake mechanism, and the operator can add his physical force to the brake mechanism after the brakes are fully applied, and can apply the brakes by physical force as previously described. When the brakes are partly applied and the operator stops the forward movement of the pedal, and the movement of the piston which is connected at the point, 444, with the floating lever, 440, will operate the valve mechanism to lock the vacuum and hold the brakes as applied.

It will be understood that in any of the installations herein shown, the physical force of the operator may be applied to one set of brake mechanisms, and the power of the actuator may be applied to another set of brake mechanisms of the same or a different vehicle, as a trailer, and the double floating lever construction shown in Fig. 9 is also applicable to a valve which is operated by a pushing action instead of a pulling action, as for instance the valve mechanism connected as illustrated in Fig. 4. These features are illustrated diagrammatically in Fig. 10, in which a tractor vehicle is indicated by dotted lines at A, and the trailer vehicle is indicated by dotted lines at A¹. In this figure, the parts corresponding with those shown in Fig. 1 are given the same reference numerals with the addition of 500. In this instance the short arm of the main floating lever, 540, is connected by a link, 574, with brake mechanisms, indicated at B⁵, for the main vehicle. A connecting rod extends from the point, 544, of the main floating lever to a corresponding point, 551, of the auxiliary floating lever, 550, the short arm of which is connected by link, 589, with the pedal lever, 588. The link rod, 587, connects the long arm of the auxiliary floating lever, 550, with the valve casing, as in Fig. 4, and the link rod, 545, connects the valve actuating part with the long arm of the lever, 540, as also shown in Fig. 4. The pipe, 566, from the central chamber of the valve mechanism extends in this instance to a power actuator, P⁵, located on the trailer, A¹, and having its piston, 503, connected with brake mechanisms, B⁵ᵃ, for the trailer. In this construction when the pedal is depressed, the long arms of the levers, 540 and 550, will first be caused to move toward each other to operate the valve mechanism, so as to effect a power stroke of the piston, 503, and apply the brakes, B⁵ᵃ, by power in proportion to the amount the brakes, B⁵, are applied by the physical force of the operator. In this case the physical force of the operator required to overcome the reaction of the valve mechanism, as amplified by the floating lever construction, will be applied to the brake mechanisms, B⁵, of the main vehicle, which can be fully applied by the further exertion of physical force on the pedal, 588.

In the construction shown in Fig. 10, in which the valve mechanism is in linkage between the pedal lever and one set of brake mechanisms, and the power actuator controlled by said valve mechanism is connected with different brake mechanisms, the valve does not operate on the follow-up principle, but the reactionary force building up within the valve mechanism causes it to act as a power actuator upon itself to close off the source of power, by reseating the suction valve. In other words when the pedal is depressed and the diaphragm unseated, the differentials of pressure are built up within the valve and the actuator cylinder, tending, whenever the foot pedal is stopped, to seat the diaphragm and lock the vacuum in the actuator, so that the brakes are applied proportionately to the movement of the pedal lever and may be held as proportionately applied at any time. This reactionary movement between the diaphragm and valve casing is accompanied by a movement of the levers, 550 and 540, tending to apply the brakes, B⁵, B⁵, whenever the pedal is stopped, until the physical force exerted by the operator is greater than the reactionary force within the valve. In this construction in applying the brakes, those of the trailer may be applied first and to a greater extent than the tractor brakes until the trailer brakes are fully applied by power, after which the tractor brakes may be further applied to the full extent of the physical force of the operator, and this is desirable in some instances to prevent the running up of the trailer on the main vehicle. Obviously the actuator, P⁵, could be mounted on the main vehicle and connected with the brake mechanisms, B⁵ by connecting the piston rod to the upper end of the floating lever, 540, as indicated in Fig. 10ᵃ.

As shown in Figs. 9, 10 and 10ᵃ, the floating levers and also the auxiliary floating lever are provided with a series of holes for adjusting the leverage at which the reaction of the valve mechanism is transmitted to the pedal, to suit the particular installation in which the construction is used. In these figures the floating levers are supported in the linkage.

In Fig. 11 we have shown another modification of our invention in which the valve mechanism is connected with and supported by a link or arm pivoted to the chassis, or keyed to a brake shaft, as for example the arm, 77 in Fig. 1, and operatively connected with the power actuator and the brake mechanism, the floating lever in this instance being of angular form and connected to said link or arm, to the valve mechanism and to the pedal lever. In this figure, the parts corresponding with those shown in Fig. 1 are given the same reference numerals with the addition of 600. In this figure, 642 represents the link or arm pivoted at 642ᵃ, and provided with a series of apertures for the connection of the various parts of the apparatus thereto. The lower end of this link or arm is connected with the power actuator by the link rod, 678, or the shaft, 642, which may operate the brakes as shaft, 76 in Fig. 1, and said arm or link is connected intermediate its ends with the brake mechanism by the link rod, 678. The valve mechanism illustrated as a whole at V⁶, has the valve casing in this instance connected by lugs, 606ˣ, with the arm or lever, 642, and the valve actuating part is connected by the link rod, 687, with the floating lever, 640, which is also provided with a series of adjusting apertures, 640ᵃ. The other end of the floating lever is provided with an angular arm, 640ᵇ, which is pivotally connected to the arm, 642. The floating lever is connected by a link, 689, with the pedal. The pedal, brake mechanism, and power actuator are not shown in this figure, but the relation of the parts will be clearly understood.

It will be noted that the pull of the pedal lever will operate the valve mechanism by tension, thereby reducing the power stroke of the actuator effective on the arm, 642, to apply the brakes. The operation is substantially as hereinbefore described with reference to Fig. 1, and the reactionary force of the valve mechanism will be multiplied through the floating lever and transmitted to the pedal, while the physical force required to overcome this reactionary force will be transmitted through the floating lever, 640, an arm or lever, 642, to the brake mechanism. This construction also provides for locking the vacuum at any stage in the application of the brakes in the manner previously described, and permits the operator to apply his physical force to the brake mechanism to assist the actuator after the latter has exerted its maximum force, or to apply the brakes by physical force alone, substantially as before described with reference to the other figures.

In Fig. 12 we have shown an arrangement similar to that shown in Fig. 11, for operating a valve mechanism by a pushing action instead of a pulling action, and as this form of apparatus is readily adapted for use in connection with a hydraulic brake system, we have shown the parts in Fig. 12 in connection with the means for operating the pressure piston of a hydraulic brake system of known type. The parts shown in Fig. 12 which correspond with those shown in Figs. 1 and 2 are given the same reference numerals with the addition of 700. In Fig. 12, 742 represents the pivoted supporting lever, which is supported by the shaft 742$^a$, and is provided with a series of apertures for the connection of the various parts of the apparatus. The lower end of this arm is connected by the power actuator with the link rod, 779, and this arm is connected with the brake mechanism, if of ordinary construction, in the same manner as shown in Fig. 11. If the apparatus is used in connection with a hydraulic system, as indicated in Fig. 12 for example, the arm, 742, can be conveniently secured rigidly to the shaft, 742$^a$, and said shaft connected in a well known way, as by an arm, 754, for operating a pressure piston, 752, in a pressure cylinder, 751, within a suitable housing, 750, the pressure cylinder being connected by a pipe, 774, with the individual brake operating cylinders for the brake mechanisms of the several wheels. The hydraulic brake apparatus forms no part of our present invention and will not be particularly described. The valve mechanism illustrated as a whole at V$^7$, is of the type illustrated in Fig. 4, and is connected as shown in that figure, the valve actuating part being connected by a yoke, 745, with the arm, 742, and the valve casing being connected by a similar yoke, 787, with the upper end of the L-shaped floating lever, 740, which has the usual series of apertures, 740$^a$, for purposes of adjustment. The horizontal arm, 740$^b$, of the floating lever is pivotally connected with the arm, 742, adjacent to its lower end, and the floating lever is provided with the downwardly extending projecting portion, 740$^c$, which is connected by link, 789, to the pedal lever at a point below the point of pivoting of the arm, 740$^b$, with the arm 742. The operation of the parts shown in Fig. 12 is the same as that previously described with reference to Fig. 11, except that the pedal is so connected with the floating lever that when the pedal is depressed the forward movement of the link rod, 789, will produce a rearward push on the upper end of the floating lever to operate the valve mechanism, the reacting effect of which will be transmitted to the pedal lever multiplied in accordance with the leverage of said floating lever. It will also be seen that the movement of the arm, 742, by the power actuator will tend to move the upper end of the floating lever forwardly and effect the follow-up movement of the valve, as previously described, to lock the vacuum and hold the brakes as applied. The operator can also apply his physical force directly to the arm, 742, and to the brake mechanism, in overcoming the reaction of the valve, V$^7$, as well as in adding his physical force to that of the actuator, and operating the brake mechanism by physical force alone in case of failure of power.

In Fig. 13 we have shown a further modification of our invention, in which the valve is shown as being operated by a pull movement, as in Figs. 1 and 2. The parts in this figure which correspond with those shown in Figs. 1 and 2 are given the same reference numerals with the addition of 800. The apparatus is shown in connection with a hydraulic system similar to that shown in Fig. 12, but with the hydraulic cylinder reversed with respect to the chassis. The main hydraulic pressure cylinder, as indicated at 851, is located within a suitable housing, 850, secured to the chassis, and provided with a pressure piston, 852, operated by an arm, 854, secured to a rock shaft, 842$^a$, mounted in the housing, 850, which latter also serves as a reservoir of the pressure fluid in a well known way. In this instance the secondary lever, 842, is mounted on the shaft, 842$^a$, or otherwise operatively connected therewith, and extends above and below its point of pivoting. The floating lever, 840, is pivotally mounted at 840$^x$, upon the upwardly extending arm of the power applying lever, 842, and is provided with offset arms extending above and below the point of pivoting. The upwardly extending arm of the lever, 840, is connected by the link, 889, with the pedal lever at a point above the pivotal support therefor. The downwardly extending arm of the floating lever, 840, is connected with the power applying lever, 842, through the valve mechanism, V$^8$, which is of the pull type shown in Fig. 2, the relatively movable parts of the valve mechanism being connected respectively to the floating lever, 840, by the link, 887, and to the power applying lever, 842, by the lugs, 845. The lower end of the power applying lever, 842, is connected by link, 889, with the movable member of the power actuator, which exerts its force rearwardly in the direction of the arrow in Fig. 13.

The operation of the parts shown in Fig. 13 is substantially the same as that previously described with reference to Fig. 11, except that the pedal is so connected with the floating lever, 840, that when the pedal is depressed, the forward movement of the link rod, 889, will produce a rearward movement of the lower end of the floating lever to operate the valve mechanism, the reacting effect of which will be transmitted to the pedal lever multiplied in accordance with the leverage of the effective arms of the floating lever. It will also be seen that the rearward movement of the lower end of arm, 842, by the power actuator will tend to return the valve to its normal position and effect the follow-up movement of the valve, to lock the vacuum and hold the brakes as applied. The operator can also apply his physical force to the power applying lever, 842, whenever the lost motion between the relatively movable parts of the valve mechanism, $V^8$, is taken up. The arms of the power applying lever, 842, and the arms of the floating lever, 840, are provided with adjusting apertures to vary the leverage at which the reactionary force of the valve, $V^8$, will be applied to the foot lever, and to secure the desired operation of the parts. One advantage of the arrangement shown in Fig. 13 is that it can be used either with a valve operated either by a pulling or pushing action. If it is desired to use a valve which operates by the pushing action, it is only necessary to reverse the position of the floating lever, 840, with respect to the other parts, so that the downwardly extending arm will extend on the forward side of the lower arm of the power applying lever instead of on the rearward side of said arm, the valve being connected between the lower end of the floating lever and the power applying lever.

In Fig. 14, in which the parts illustrated in Fig. 13 are given the same reference characters with the addition of 100, we have shown the same parts arranged as above described for operating a valve mechanism, $V^9$, by a pushing action. In Fig. 14 the floating lever, indicated at 940, has its downwardly extending arm on the forward side of the power applying lever, 942, and is pivoted to the upper end of the latter at $940^x$. The valve mechanism, $V^9$, is connected to the power applying lever, 942, by the lugs, 945, and the valve actuating part is connected with the downwardly extending arm of the floating lever by the link, 987. The apparatus shown in Fig. 14 will operate in the same manner as the apparatus shown in Fig. 13, except that the valve mechanism is operated by a pushing action instead of a pulling action to effect the operation of the power actuator.

In Fig. 15, in which the parts corresponding with those shown in Figs. 1 and 2 are given the same reference characters with the addition of 1000, we have shown the floating amplifying lever and the connections between it and the valve mechanism and the pedal lever exactly as heretofore shown and described with reference to Figs. 1 and 2, but the physical force of the operator is applied to one set of brakes, while the power of the actuator controlled by the valve mechanism is applied to another set of brakes which may be on the same or a different vehicle, but are here shown on the trailer, as in Fig. 10. In this instance the rod, 1078, has its forward end connected with the lever, 1040, at 1044, and its rear end connected to an arm, 1077, on a cross-shaft, 1076, connected with the brakes, $B^7$, $B^7$, of the main vehicle, indicated at $A^{10}$, in dotted lines. The pipe, 1066, extends from the valve mechanism, $V^{10}$, to the cylinder, 1001, of the power actuator, indicated on the trailer, $B^{10}$, and the piston, 1003, of the power actuator is connected with brake mechanism, $B^8$, $B^8$, for the trailer. The valve mechanism, $V^{10}$, is of the type shown in Fig. 2 and is operated by a pulling action. When the operator depresses the pedal, the valve mechanism, $V^{10}$, will be operated so as to start the application of the trailer brakes, $B^8$, $B^8$, by the power actuator, while at the same time the operator feels the reaction from the diaphragm and disc valve through the rod, 1087, and the reaction from the valve casing, amplified by the lever, 1040, and transmitted to the pedal through the rod, 1089, thus providing a greater amount of reaction on the pedal at any degree of vacuum than in the construction illustrated in Fig. 10, so that the operator is required to exert greater physical strength to continue the application of the brakes of the trailer by power than in the construction shown in the last mentioned figure. It will be seen that the pressure on the pedal to overcome this reactionary force, however, will not be transmitted to the brake mechanisms connected with the actuator, but will be applied to the brake mechanisms, $B^7$, $B^7$, directly connected with the floating lever, 1040, which can be fully applied by the further exertion of physical force on the pedal, 1088.

It will be understood that in any of the embodiments of our invention herein shown and described, the controlling valve mechanism may operate more than one cylinder. In Fig. 16 for example, in which the parts corresponding with those shown in Figs. 1 and 2 are given the same reference numerals with the addition of 1100, we have shown the embodiment of our invention illustrated in Fig. 1 and including the power actuator cylinder, 1101, mounted on the main vehicle, the piston, 1103, of which is connected with the lever, 1140, at 1144, and connected by the link, 1178, with the brake mechanisms, B⁹, B⁹, of the main vehicle, A¹¹. In this case the forward end of the actuator cylinder, 1101, is connected by an auxiliary pipe, 1166ª, with a power actuator cylinder, 1101ª, on the same or a different vehicle, in this instance a trailer, B¹¹, and having its piston, 1103ª, connected with other brake mechanisms, B¹⁰, B¹⁰, in this instance trailer brake mechanisms. Obviously the operation of the valve will cause the power actuators to act substantially simultaneously under the control of the valve mechanism, and the pipe, 1166ª, is shown provided with a cut-off valve, 1166ᵇ, which can be closed when the auxiliary power actuator cylinder, 1101ª, is not in use, in this instance for example, when the trailer, B¹¹, is disconnected from the main vehicle, A¹¹.

What we claim and desire to secure by Letters Patent is:—

1. In a brake system for automotive vehicles, the combination with brake mechanisms, a power actuator operated by differentials of fluid pressures, operatively connected with certain of said brake mechanisms, and controlling valve mechanism for the actuator movable with respect thereto and comprising relatively movable parts and means for limiting their relative movement, of a floating lever operatively connected with certain of said brake mechanisms, and a physically operable lever connected with said floating lever at one point therein and connected with said floating lever at another point therein through the relatively movable parts of said valve mechanism, certain of the relatively movable parts of said valve mechanism being subjected at all times during a power stroke of the actuator to the differential of fluid pressures in the actuator to effect a reaction against the physically operable lever, and tending to move the valve mechanism into position to arrest the stroke of the actuator.

2. In a brake system for automotive vehicles, the combination with brake mechanisms, a power actuator operated by differentials of fluid pressures, operatively connected with certain of said brake mechanisms, and controlling valve mechanism for the actuator movable with respect thereto and comprising relatively movable parts and means for limiting their relative movement, of a floating lever operatively connected with certain of said brake mechanisms, and a physically operable lever connected with said floating lever at one point therein and connected with said floating lever at another point therein through the relatively movable parts of said valve mechanism, certain of the relatively movable parts of said valve mechanism being subjected at all times during a power stroke of the actuator to the differential of fluid pressures in the actuator to effect a reaction against the physically operable lever, and tending to move the valve mechanism into position to arrest the stroke of the actuator, said reaction being transmitted to said physically operable lever from one of said valve parts through said floating lever at increased leverage.

3. In a brake system for automotive vehicles, the combination with brake mechanisms, a power actuator operated by differentials of fluid pressures, operatively connected with certain of said brake mechanisms, and controlling valve mechanism for the actuator movable with respect thereto and comprising relatively movable parts and means for limiting their relative movement, of a floating lever operatively connected with certain of said brake mechanisms, and a physically operable lever connected with said floating lever at one point therein and connected with said floating lever at another point therein through the relatively movable parts of said valve mechanism, certain of the relatively movable parts of said valve mechanism being subjected at all times during a power stroke of the actuator to the differential of fluid pressures in the actuator to effect a reaction against the physically operable lever, and tending to move the valve mechanism into position to arrest the stroke of the actuator, said reaction being transmitted to said physically operable lever from one of said valve parts independently of the floating lever and from the other of said valve parts through said floating lever at increased leverage.

4. In a brake system for automotive vehicles, the combination with brake mechanisms, a power actuator operated by differentials of fluid pressures, operatively connected with certain of said brake mechanisms, and controlling valve mechanism for the actuator movable with respect thereto and comprising relatively movable parts and means for limiting their relative movement, of a floating lever operatively connected with certain of said brake mechanisms, and a physically operable lever connected with said floating lever at one point therein and connected with said floating lever at another point therein through the relatively movable parts of said valve mechanism, certain of the relatively movable parts of said valve mechanism being subjected at all times during a power stroke of the actuator to the differential of fluid pressures in the actuator to effect a reaction against the physically operable lever, and tending to move the valve mechanism into position to arrest the stroke of the actuator, said reaction being transmitted to said physically operable lever from one of said valve parts through said floating lever at increased leverage, and means for varying the leverage of said floating lever between the valve mechanism and the physically operable lever.

5. In a brake system for automotive vehicles, the combination with brake mechanisms, a power actuator operated by differentials of fluid pressures, and controlling valve mechanism for the actuator movable with respect thereto and comprising relatively movable parts and means for limiting their relative movement, of a floating lever operatively connected with said brake mechanisms, connections from said brake mechanisms to said power actuator, and a physically operable lever connected with said floating lever at one point therein and connected with said floating lever at another point therein through the relatively movable parts of said valve mechanism, certain of the relatively movable parts of said valve mechanism being subjected at all times during a power stroke of the actuator to a differential of fluid pressures in the actuator to effect a reaction against the physically operable lever, and tending to move the valve mechanism into position to arrest the stroke of the actuator, said reaction being transmitted to the physically operable lever from one of said valve parts independently of the floating lever and from the other of said valve parts through said floating lever at increased leverage.

6. In a brake system for automotive vehicles, the combination with brake mechanisms, a power actuator operated by differentials of fluid pressures, operatively connected with certain of said brake mechanisms, and controlling valve mechanism for the actuator movable with respect thereto and comprising relatively movable parts and means for limiting their relative movement, of a floating lever operatively connected at a pivotal point therein with certain of said brake mechanisms, and a physically operable lever connected with said floating lever at a point on one side of said pivotal point and connected with said floating lever on the opposite side of said pivotal point, through the relatively movable parts of said valve mechanism.

7. In a brake system for automotive vehicles, the combination with brake mechanisms, a power actuator operated by differentials of fluid pressures, operatively connected with certain of said brake mechanisms, and controlling valve mechanism for the actuator movable with respect thereto and comprising relatively movable parts and means for limiting their relative movement, of a floating lever operatively connected at a pivotal point with certain of said brake mechanisms, a physically operable lever, connections from said lever to the floating lever at one side of the said pivotal point therein, a connection from said physically operable lever to one of the relatively movable parts of the valve mechanism, and a connection from the other of said valve parts to the floating lever on the opposite side of said pivotal point therein.

8. In a brake system for automotive vehicles, the combination with brake mechanisms, a power actuator operated by differentials of fluid pressures, operatively connected with certain of said brake mechanisms, and controlling valve mechanism for the actuator movable with respect thereto and comprising relatively movable parts and means for limiting their relative movement, of a floating lever operatively connected at a pivotal point therein with certain of said brake mechanisms, and a physically operable lever connected with said floating lever at a point on one side of said pivotal point and connected with said floating lever on the opposite side of said pivotal point, through the relatively movable parts of said valve mechanism, certain of the relatively movable parts of said valve mechanism being subjected at all times during a power stroke of the actuator to a differential of fluid pressures in the actuator to effect a reaction against the physically operable lever and tending to move the valve mechanism into position to arrest the stroke of the actuator.

9. In a brake system for automotive vehicles, the combination with brake mechanisms, a power actuator operated by differentials of fluid pressures, operatively connected with certain of said brake mechanisms, and controlling valve mechanism for the actuator movable with respect thereto and comprising relatively movable parts and means for limiting their relative movement, of a floating lever operatively connected at a pivotal point therein with certain of said brake mechanisms, and a physically operable lever connected with said floating lever at a point on one side of said pivotal point and connected with said floating lever on the opposite side of said pivotal point, through the relatively movable parts of said valve mechanism, certain of the relatively movable parts of said valve mechanism being subjected at all times during a power stroke of the actuator to a differential of fluid pressures in the actuator to effect a reaction against the physically operable lever and tending to move the valve mechanism into position to arrest the stroke of the actuator, the reactionary force on one of said valve parts being transmitted to the physically operable lever through said floating lever.

10. In a brake system for automotive vehicles, the combination with brake mechanisms, a power actuator operated by differentials of fluid pressures, operatively connected with certain of said brake mechanisms, and controlling valve mechanism for the actuator movable with respect thereto and comprising relatively movable parts and means for limiting their relative movement, of a floating lever operatively connected at a pivotal point with certain of said brake mechanisms, a physically operable lever, connections from said lever to the floating lever at one side of the said pivotal point therein, a connection from said physically operable lever to one of the relatively movable parts of the valve mechanism, and a connection from the other of said valve parts to the floating lever on the opposite side of said pivotal point therein, the relatively movable parts of said valve mechanism being subjected at all times during a power stroke of the actuator to a reactionary force varying with the differential of fluid pressures in the actuator, said force being transmitted to said physically operable part from one of said valve parts independently of the floating lever and from the other of said valve parts through the floating lever at increased leverage.

11. In a brake system for automotive vehicles, the combination with brake mechanisms, a power actuator operated by differentials of fluid pressures, and controlling valve mechanism for the actuator movable with respect thereto and comprising relatively movable parts and means for limiting their relative movement, of a floating lever operatively connected at a pivotal point with the actuator and with said brake mechanisms, and a physically operable lever connected with said floating lever at a point removed from the pivotal point thereof and connected with said floating lever at another point therein further removed from said pivotal point, through the relatively movable parts of said valve mechanism.

12. In a brake system for automatic vehicles, the combination with brake mechanisms, a power actuator operated by differentials of fluid pressures, and controlling valve mechanism for the actuator movable with respect thereto and comprising relatively movable parts and means for limiting their relative movement, of a floating lever operatively connected at a pivotal point with the actuator and with said brake mechanisms, and a physically operable lever connected with said floating lever at one side of said pivotal point therein and connected with said floating lever at another point on the opposite side of said pivotal point through the relatively movable parts of said valve mechanism.

13. In a brake system for automotive vehicles, the combination with brake mechanisms, a power actuator operated by differentials of fluid pressures, and controlling valve mechanism for the actuator movable with respect thereto and comprising relatively movable parts and means for limiting their relative movement, of a floating lever operatively connected at a pivotal point with the actuator and with said brake mechanisms, and a physically operable lever connected with said floating lever at a point removed from the pivotal point thereof and connected with said floating lever at another point therein further removed from said pivotal point, through the relatively movable parts of said valve mechanism, the relatively movable parts of said valve mechanism being subjected at all times during a power stroke of the actuator to a reactionary force varying with the differential of fluid pressures in the actuator and acting against the physically operable lever, the reactionary force from one of said valve parts being transmitted to said physically operable lever through said floating lever.

14. In a brake system for automotive vehicles, the combination with brake mechanisms, a power actuator operated by differentials of fluid pressures, and controlling valve mechanism for the actuator movable with respect thereto and comprising relatively movable parts and means for limiting their relative movement, of a floating lever operatively connected at a pivotal point with the actuator and with said brake mechanisms, and a physically operable lever connected with said floating lever at one side of said pivotal point therein and connected with said floating lever at another point on the opposite side of said pivotal point through the relatively movable parts of said valve mechanism, certain of the relatively movable parts of said valve mechanism being subjected at all times during a power stroke of the actuator to a differential of fluid pressures in the actuator to effect a reaction against the physically operable lever, and tending to move the valve mechanism into position to arrest the stroke of the actuator, the reactionary force being transmitted to the physically operable lever from one of said valve parts through the floating lever.

In testimony whereof we affix our signatures.

CALEB S. BRAGG.
VICTOR W. KLIESRATH.